June 15, 1954          E. J. JANIS          2,680,926
FISHING LURE
Filed Jan. 23, 1951
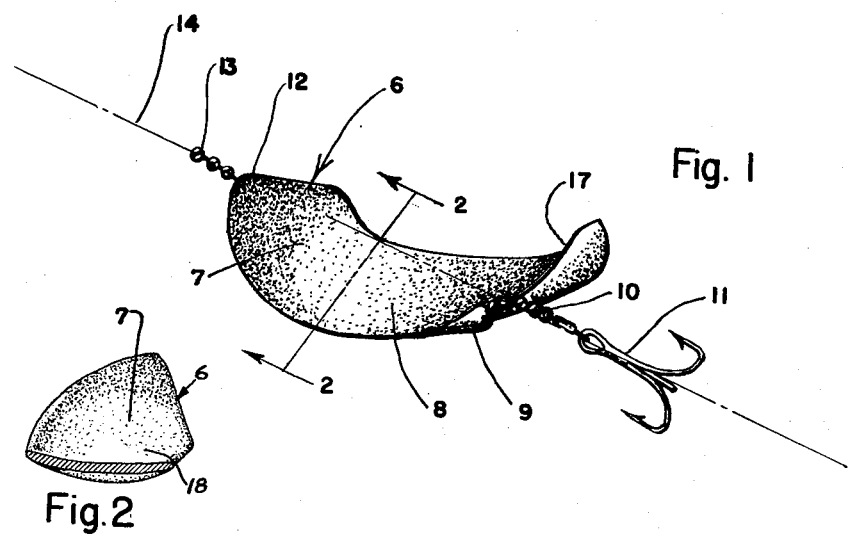
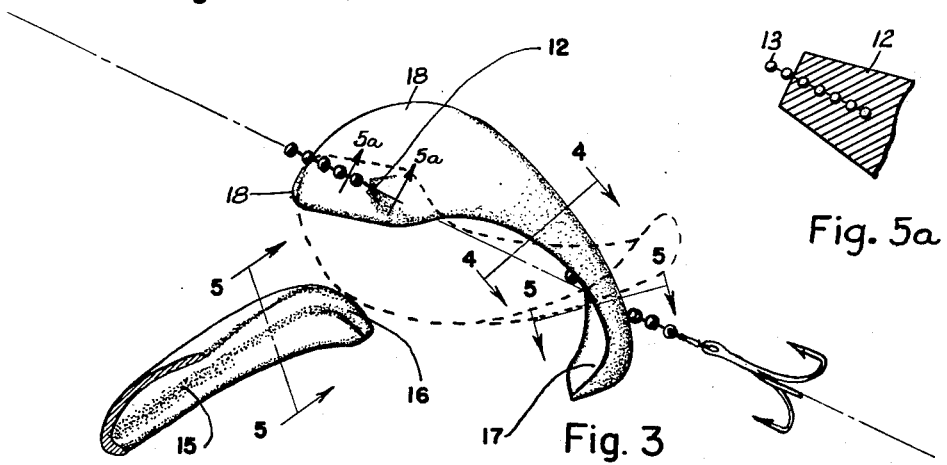
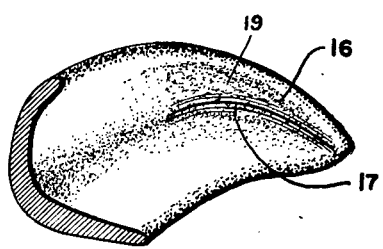
*INVENTOR.*
Edward J. Janis
BY
ATTORNEY

Patented June 15, 1954

2,680,926

UNITED STATES PATENT OFFICE 2,680,926

FISHING LURE

Edward J. Janis, Chicago, Ill.

Application January 23, 1951, Serial No. 207,365

1 Claim. (Cl. 43—42.5)

My invention relates to fishing lures having special reference to the spoon type of fishing lure.

An important object of my invention is to provide a lure which has a free swimming, rotating and wobbling, side-to-side action when retrieving a line subsequent to having cast the lure.

An important object of my invention is to provide a lure of the aforementioned character which is provided with a leading slightly curved head portion merging with a tail portion having a channeled portion therein terminating in an arcuately bent section defining a pocket portion which will aid the wobbling action, or movement from side to side, of the lure while rotating during retrieving of the lure submerged in water.

Another object of my invention is to provide a lure of the aforementioned character which, when retrieved in the water, will be offset in submersion to an angle of about 30 degrees with the surface of the water, and one which is provided with channel and pocket sections causing an upward thrust of the water against the inner side of the said channel and a rearward thrust against the said pocket causing the fishing lure to revolve about an imaginary axis as indicated in the various views.

A still further object of my invention is to provide a fishing lure of the aforementioned character which may be molded or otherwise manufactured in one single piece, or element, and having attached thereto swivel connections or elements for attaching the fishing line, and directly opposed thereto having attached another swivel connection or element for attaching fish hooks thereto.

A still further object of my invention is to provide a lure of the aforementioned character which will provide animation when operated submerged below the surface of the water to attract the fish.

A still further object of my invention is to provide a lure of the aforementioned character of such simple construction as to lend itself ideally to economical manufacture in quantity production.

Other objects, and advantages inherent in my invention will become apparent to those familiar with the art, by reference to the accompanying drawings, bearing further elucidation in the ensuing description, wherein like parts are designated by like symbols, and in which;

Fig. 1 is a side elevation of my invention showing it in one position during the retrieving action subsequent to the lure having been cast.

Fig. 2 is a cross-sectional view taken substantially on the line 2—2 of Fig. 1.

Fig. 3 is a view similar to Fig. 1 in a different position illustrating the motion of the lure during retrieve when rotation and lateral wobbling are taking place.

Fig. 4 is a cross-sectional view taken substantially on the line 4—4 of Fig. 3.

Fig. 5 is an enlarged cross-sectional view taken substantially on the line 5—5 of Fig. 4 and Fig. 3.

Fig. 5a is a fragmentary cross-sectional view taken substantially on lines 5a—5a of Fig. 3 to show the anchoring hub portion 12 in detail; hub portion 9 being similar thereto.

Referring to the various views, my invention is generally designated 6, and consists of a spoon-shaped structure having a leading head portion 7 rounded to form a hump portion 18 (see Fig. 3), and a tail portion 8. The head portion 7 is wider, and tapers down to merge with the tail portion 8. The tail portion 8 is provided with a swivel element 10 embedded in the anchoring hub portion 9, fish hooks 11 being removably secured to the free terminus of the said swivel element 10. The free terminal of the swivel connection 13 is connected to a fishing line and when the said lure 6 is cast the fishing line will cause the lure to be submerged to an angle of approximately 30 degrees to the surface of the water and rotate about the imaginary geometrical axis 14 indicated. The swivel connection 13 is embedded in the anchoring hub portion 12 illustrated in enlarged section at Figure 5a.

The lower, or tail, section 8 of the lure is tapered as indicated in Fig. 4 and has a channel-like construction 15 terminating in a laterally arcuate bend at 16 thus defining the pocket portion 17 which bucks the water pressure against which the lure has to operate when the fishing line and the lure are being retrieved.

The pocket 17 is illustrated fully in the enlarged view of Fig. 5. When the lure is retrieved, it will submerge at an angle of approximately 30 degrees with the surface of the water.

The pocket 17 is offset from the axis 14 of rotation of the lure, as best shown in Fig. 3, and is of varying depth and width due to the tapering of the lure, reaching its greatest depth at 19.

When the lure is pulled or retrieved through the water, it assumes an angle of approximately 30° with the surface of the water. The contact of the water with the front face of the head portion 7 of the lure, the channel portion 15 and the pocket 17, causes the lure to rotate about the axis 14 and to wobble from side to side, thus simulating the animated action of a swimming minnow.

It is to be understood that changes may be made in the construction and in the combination and arrangement of the several parts, provided that such changes fall within the scope of the appended claim.

Having thus disclosed and revealed my invention, what I claim as new and desire to secure by Letters Patent is:

A fishing lure of the spoon type capable of a free swimming action when retrieved, comprising a leading head portion defining an enlarged hump portion merging with a tapered tail portion including a channel portion terminating in an arcuately bent portion defining a liquid repelling pocket portion facing the said hump portion, the said channel portion extending into the said pocket portion and reaching its greatest depth in the said pocket portion, the swimming action to which the said lure is susceptible on retrieve including rotation coupled with side to side wobbling actions simultaneously.

References Cited in the file of this patent

UNITED STATES PATENTS

| Number | Name | Date |
|---|---|---|
| 1,169,683 | Sebenius | Jan. 25, 1916 |
| 1,566,059 | Willson | Dec. 15, 1925 |
| 1,627,637 | Dahlquist | May 10, 1927 |
| 1,837,558 | Lent | Dec. 22, 1931 |
| 1,854,028 | Gruenhagen | Apr. 12, 1932 |
| 2,058,121 | Allen | Oct. 20, 1936 |
| 2,596,959 | Roes | May 13, 1952 |
| 2,608,788 | Niemi | Sept. 2, 1952 |

FOREIGN PATENTS

| Number | Country | Date |
|---|---|---|
| 546,756 | France | Nov. 23, 1922 |
| 958,469 | France | Mar. 9, 1950 |